United States Patent [19]

Ohno

[11] Patent Number: 4,707,707

[45] Date of Patent: Nov. 17, 1987

[54] THERMAL-TRANSFER INK RIBBON

[75] Inventor: Tadayoshi Ohno, Kawasaki, Japan

[73] Assignee: Kabushiki Kaisha Toshiba, Kawasaki, Japan

[21] Appl. No.: 847,446

[22] Filed: Apr. 3, 1986

[30] Foreign Application Priority Data

Apr. 9, 1985 [JP] Japan .................................. 60-73428

[51] Int. Cl.[4] ......................... G01D 15/16; B41J 3/20; B41M 3/12

[52] U.S. Cl. ............................... 346/76 PH; 400/120; 400/241.1; 400/241.2; 156/240; 156/241; 427/146; 428/206; 428/209; 428/346; 428/352; 428/913; 428/904

[58] Field of Search ................ 346/76 PH; 400/241.1, 400/241.2, 120; 350/105; 156/240, 241; 428/206, 207, 209, 323, 346, 352, 354, 913, 914; 427/146

[56] References Cited

U.S. PATENT DOCUMENTS

| | | | |
|---|---|---|---|
| 4,157,412 | 6/1979 | Deneau | 428/147 |
| 4,496,618 | 1/1985 | Pernicano | 428/201 |

FOREIGN PATENT DOCUMENTS

| | | | |
|---|---|---|---|
| 46-15479 | 4/1971 | Japan . | |
| 55-105579 | 8/1980 | Japan | 400/241 |

OTHER PUBLICATIONS

Richard D. Joyce and Stanley Homa, Jr.–"High-Speed Thermal Printing"–Fall-Joint Computer Conference, 1967, pp. 261–267.

S. Ando, H. Ogata, "A Basic Study of Thermal Transfer Printing for Improvement of Printing Quality", 1985, SID International Symposium Digest of Technical Paper, pp. 160–163.

*Primary Examiner*—Clifford C. Shaw
*Assistant Examiner*—Gerald E. Preston
*Attorney, Agent, or Firm*—Oblon, Fisher, Spivak, McClelland & Maier

[57] ABSTRACT

An ink ribbon comprises an ink supporting member, an intermediate layer mounted on the ink supporting member, and ink mounted on the intermediate layer. The ink has supercooling property and is susceptible to softening or melting by heat, and the intermediate layer is adapted to reduce adhesion of the ink to the intermediate layer above a temperature at which the ink is softened or melted. A thermal-transfer recording apparatus best adapted for use of the ink ribbon described above, comprises a thermal head including a plurality of heating elements and being in sliding contact with the ink ribbon, the heating elements being adapted to be heated for predetermined patterns so that the ink of the ink ribbon in sliding contact with the thermal head is heated to be softened or melted into the predetermined patterns, and is transferred to the recording paper overlapping the ink ribbon. The heating elements are located at a downstream end position, with respect to the feed direction of the ink ribbon, on the ink ribbon sliding contact surface of the thermal head.

34 Claims, 5 Drawing Figures

THERMAL-TRANSFER INK RIBBON

FIELD OF THE INVENTION

The present invention relates to an ink ribbon used by a thermal-transfer recording apparatus and a thermal-transfer recording apparatus best adapted for use therewith.

BACKGROUND OF THE INVENTION

Conventionally, in thermal-transfer recording apparatuses, an ink ribbon overlapping recording paper is heated by a thermal head for desired patterns, such as figures, characters or other signs, so that ink on the ribbon is softened or melted and then transferred to the paper to form the desired patterns thereon. After the transfer, the ribbon is separated from the paper.

The thermal-transfer recording apparatuses using the ink ribbon in which hot melting type ink or hot-softening type ink is mounted on an ink supporting member, and recording desired pattens on a recording paper, can record the desired patterns on the recording paper with a high durability, and are maintenance-free and highly reliable. The recording apparatus of this type have already started to be widely used for both office and personal services, and are still being positively studied and developed in various places.

In the conventional thermal-transfer recording apparatuses, however, ordinary paper, such as PPC paper, bond paper, etc., cannot be used for the recording paper, and special paper with a smoother surface must be used exclusively. If any ordinary paper is used, only a plurality of microscopic projections on the surface of the paper can be in contact with the ink on the ink ribbon. In transferring the ink softened or melted into a desired pattern to be transferred on the surface of the recording paper by means of heating elements on the thermal head constituting the desired patterns, therefore, only those projecting surface portions of the recording paper contacted the ink can catch the ink. Thus, the resulting patterns on the paper are subject to undesired voids or uninked spots.

OBJECTS OF THE INVENTION

The present invention is contrived in consideration of these circumstances, and it is a first object of the invention to provide an ink ribbon capable of satisfactorily transferring ink even to ordinary paper, such as PPC paper, bond paper, etc., without any voids or uninked spots. A second object of the invention is to provide a thermal-transfer recording apparatus best adapted for use with the aforesaid ink ribbon.

SUMMARY OF THE INVENTION

The first object of the invention may be achieved by an ink ribbon which comprises an ink supporting member, an intermediate layer mounted on the ink supporting member, and ink mounted on the intermediate layer, the ink having supercooling property and being susceptible to softening or melting by heat, and the intermediate layer being adapted to reduce adhesion of the ink to the intermediate layer above a temperature at which the ink is softened or melted.

When the ink on the ink ribbon, constructed in this manner, is softened or melted by a plurality of heating elements on a thermal head forming desired patterns to be transferred to the surface of recording paper, adhesion of the ink to the intermediate layer is reduced.

Once softened or melted, the ink, which has supercooling property, remains unsolidified for a predetermined time. Accordingly, even if PPC paper, bond paper or other ordinary paper, of which only the projecting surface portions can be touched by the ink, is used for the recording paper, the ink can very easily be transferred from the intermediate layer of the ink ribbon to the recording paper. Thus, the desired patterns can be inked or recorded on the ordinary paper without voids.

Preferably, in the ink ribbon of the invention described above, the intermediate layer is a metal film. The metal film can be formed on the ink supporting member at low cost by a well-known method.

In the ink ribbon, moreover, the intermediate layer may include capsules distributed substantially uniformly on the ink supporting member and being destroyed when the capsules are heated above a temperature at which the ink is softened or melted, and an adhesion reducing agent stored in the capsules and adapted to reduce the adhesion of the intermediate layer to the softened or melted ink.

In this case, the capsules preferably store a foaming agent being susceptible to foam when the foaming agent is heated above the temperature at which the ink is softened or melted. The foaming agent secures the destruction of the capsules. That is, the transfer of the ink from the intermediate layer to the recording paper above a temperature at which the ink is softened or melted is securely achieved.

Preferably, the ink of the ink ribbon exhibits relatively high cohesion when it is softened or melted by heat. With this property, it can more securely be transferred from the intermediate layer to the recording paper.

The results of various experiments conducted by the inventor hereof indicate that, for secure ink transfer from the ink ribbon to the recording paper, the ink should preferably remain unsolidified for about 50 microseconds or more after the end of heating for softening or melting the ink.

The ink ribbon of the invention may further comprise a solidified ink bonding layer between the intermediate layer and the ink for strengthening the adhesion of the solidified ink to the intermediate layer. The bonding layer securely prevents the solidified ink from separating from the intermediate layer.

Further, the ink supporting member may have a heat resisting layer on the opposite side thereof to the intermediate layer. The heat resisting layer securely prevents the ink supporting member from being damaged or scorched by heat produced by the heating elements of the thermal head.

In the thermal-transfer recording apparatus best adapted for use with the ink ribbon of the invention, the ink of the ribbon remains softened or melted for a longer time after heating than that of the prior art ink ribbon does. Nevertheless, the ribbon can be separated from the recording paper immediately after the ink is heated for transfer, so that the transfer can be finished before the ink, whether softened or melted, is reduced in fluidity that is, while a good transfer condition is maintained.

If the heating elements on the ink ribbon sliding contact surface in the thermal head are located at the downstream end position with respect to the ribbon feed direction, the ribbon and the recording paper can be separated immediately after the ink of the ribbon is heated for the desired patterns.

Preferably, the recording apparatus further comprises separating means for separating the ink ribbon and the recording paper from each other the moment the ribbon and the paper, facing each other, are separated from the ink ribbon sliding contact surface of the thermal head.

Preferred embodiments and modifications of the present invention will now be described in detail with reference to the accompanying drawings.

DETAILED DESCRIPTION OF THE PREFERRED EMBODIMENTS

Figure 1:
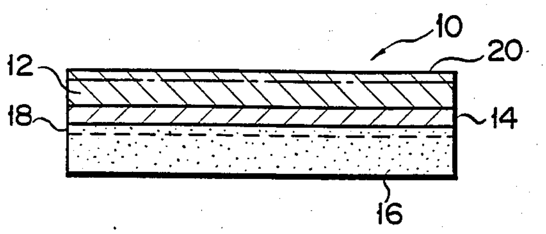
FIG. 1 is a sectional view schematically showing an ink ribbon according to a first embodiment of the present invention.

FIG. 1 shows a cross-section of an ink ribbon 10 according to a first embodiment of the present invention. The ribbon 10 comprises an ink supporting member 12, an intermediate layer 14 mounted on the ink supporting member 12, and ink 16 mounted on the intermediate layer 14.

The ink supporting member 12 may be formed from plastic film, such as polyester, polyethylene, polycarbonate, polyimide, cellophane, etc., or paper such as glassine paper, condenser paper, etc. The intermediate layer 14 may be a metal film of aluminum, nickel or tantalum formed on the ink supporting member 12 by vapor deposition, sputtering or other conventional process of deposition. Alternatively, the intermediate layer 14 may be metallic soap or case in coating the ink supporting member. The ink 16 contains a coloring material, such as carbon black or other pigment or paint, a binder, a supercooling inducing material, and it is applied to the intermediate layer 14.

The binder used may be natural or synthetic wax e.g., beeswax, carnauba wax, microcrystalline wax, etc. Also, thermoplastic resins, such as vinyl acetate-vinyl chloride copolymer, vinyl acetate-ethylene copolymer, polyamide, etc., may be used for the binder. If binders, which exhibit relatively high cohesion when the ink 16 is softened or melted, the ink 16 exhibits relatively high cohesion when it is softened or melted by heat. As binders described above, thermoplastic resins, such as vinyl acetate-vinyl chloride copolymer vinyl acetate-ethylene copolymer, etc., and mixtures of wax and thermoplastic resin, the mixtures having a melting point of approximately 50° to 200° C. (preferably about 60° to 100° C.) and having a higher proportion of wax than that of the thermoplastic resin may be used. Dicyclohexyl phthalate, benzotriazole, acetanilide, etc., may be used for the supercooling inducing material.

Figure 2:
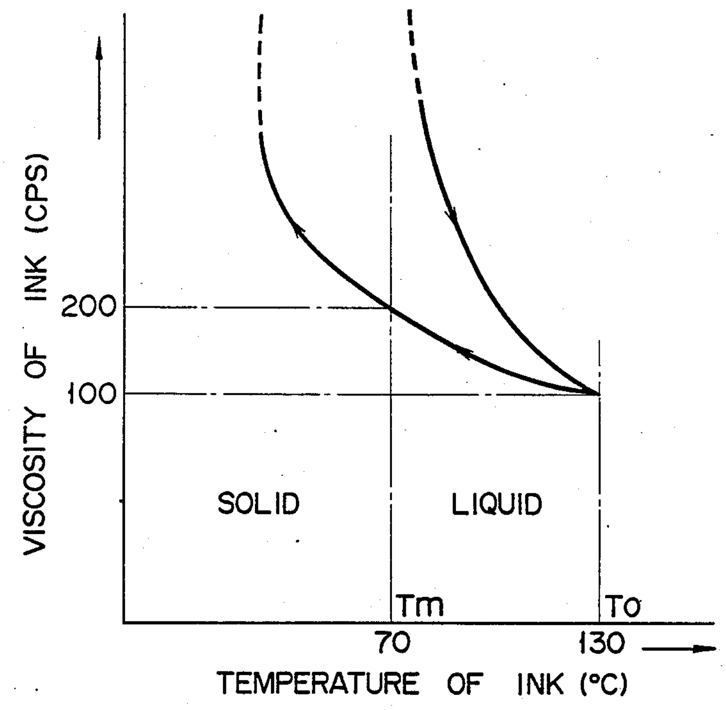
FIG. 2 is a diagram schematically showing the relationship between temperature and viscosity of ink used in the ink ribbon of FIG. 1.

FIG. 2 schematically shows the relationship between the temperature and viscosity of the ink 16 containing the supercooling inducing material according to the first embodiment of the invention. In FIG. 2, Tm indicates the melting point of the ink 16, and To designates the maximum temperature to which the ink 16 is heated by a thermal head mentioned later. In this embodiment, the ink 16 is composed of 7 parts by weight of carbon black, 3 parts by weight of oil black, 20 parts by weight of microcrystalline wax, 40 parts by weight of low-molecular ethylene-vinyl acetate copolymer, and 30 parts by weight of dicyclohexyl phthalate.

The fluidity of the ink 16 containing the supercooling inducing material is different at the times temperature of the ink 16 is increasing and its temperature is decreasing. Thus, the fluidity has a hysteretic property. During a temperature rise, the ink 16 suddenly decreases in viscosity and softens or melts when its temperature exceeds the melting point Tm. While the temperature is falling, the supercooling inducing material acts so that the viscosity of ink 16 is much lower than during the temperature rise with the temperature on the same level. Accordingly, the ink 16 can maintain its fluidity despite the temperature below the point Tm. Further, it has a supercooling region of about 20° C.

As shown in FIG. 1, the ink ribbon 10 of this embodiment further comprises a bonding layer 18 interposed between the intermediate layer 14 and the ink 16. The bonding layer 18 strengthens the adhesion of solidified ink 16 to the intermediate layer 14, thereby preventing solidified ink 16 from separating from the intermediate layer 14. The bonding layer 18 is deposited on the intermediate layer 14 by silane coupling treatment. The bonding layer 18 is destroyed when it is heated by a plurality of heating elements on a thermal head which form desired patterns, such as figures, characters and other signs, to be transferred to the surface of recording paper so as to allow the ink 16, which is softened or melted into the desired patterns, to come directly into contact with the intermediate layer 14.

As required, moreover, the ink ribbon 10 of this embodiment may be provided with a heat resisting layer 20 on that surface of the ink supporting member 12 in sliding contact with the thermal head by a well-known method. For example, the heat resisting layer 20 can be made of nitrocellulose or a fluoride.

Figure 3:
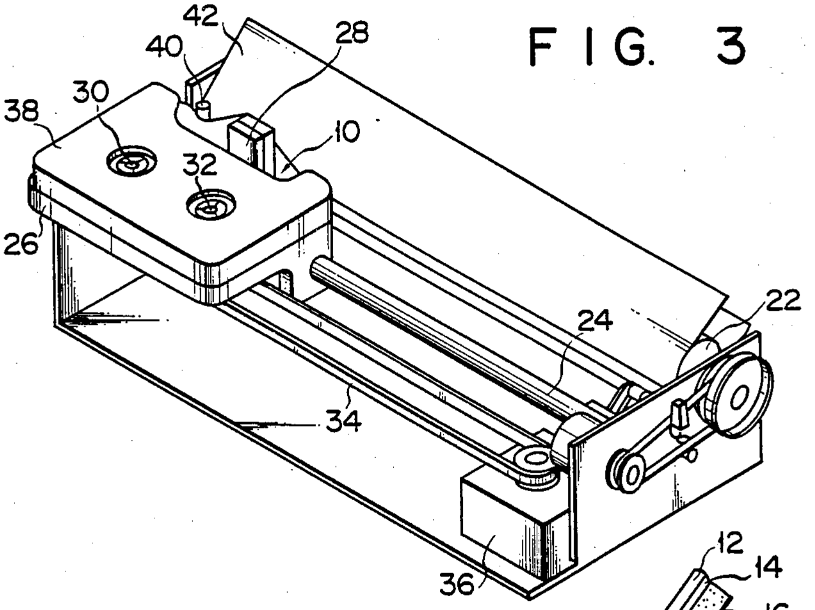
FIG. 3 is a perspective view schematically showing the principal part of a serial printer as a thermal-transfer recording apparatus best suited for use with the ink ribbon of FIG. 1.

FIG. 3 schematically shows the principal part of a serial printer, as a thermal-transfer recording apparatus, best adapted for use with the ink ribbon 10 according to the above described embodiment of the present invention. The serial printer is well known and comprises a rotatable cylindrical platen 22, a guide bar 24 extending parallel to the plate 22, and a carriage 26 mounted on the guide bar 24 so as to move in the axial direction of the guide bar 24.

A thermal head 28 having a plurality of resistors constituting the heating elements, a thermal head drive IC (not shown), an ink ribbon take-up reel shaft 30, and an ink ribbon supply reel shaft 32 are mounted on the carriage 26. When a printing circuit (not shown) supplies printing signals to the thermal head drive IC (not shown), the IC drives the resistors on the thermal head 28 constituting desired patterns, such as figures, characters and other signs, corresponding to the printing signals to generate heat. The thermal head 28 is movable between a contact position where it is in contact with the platen 22 and a noncontact position where it is kept apart from the platen 22. It is driven by a thermal head shifting mechanism (not shown).

The serial printer further comprises a carriage drive motor 36 which delivers a driving force to a carriage 26 through a belt 34, whereby the carriage 26 is reciprocated. The driving force delivered from the motor 36 to the carriage 26 is transmitted to the ink ribbon take-up reel shaft 30 by means of a gear train (not shown) mounted on the carriage 26.

The carriage 26 carries thereon ink ribbon cassette 38 which is stored with the ink ribbon 10 according to the first embodiment of this invention. The ink ribbon 10 is wound around an ink ribbon take-up reel and an ink ribbon supply reel which are rotatably held in the cassette 38 and fitted on the reel shafts 30 and 32, respectively. Between the ink ribbon take-up reel and the ink ribbon supply reel, as shown in FIG. 3, ink supporting member side surface of the ink ribbon 10 contacts the thermal head 28, and the ink-side surface of the ink ribbon 10 in the vicinity of the thermal head 28 is in contact with a ribbon-paper separating pin 40 which is fixed to the carriage 26 on the down-stream side of the thermal head 28 (that is, on the side nearer to ink ribbon take-up reel than the thermal head 28). The moment the ink ribbon 10, moving from the ink ribbon supply reel to the ink ribbon take-up reel, separates from the sliding contact surface of thermal head 28 bearing the resistors, the pin 40 keeps the ink ribbon 10 away from recoridng paper 42 on the platen 22.

The printing operation, whether in lateral or vertical lines, of the serial printer with the aforementioned conventional construction is well known. Lateral printing will be described in brief.

In the serial printer described above, when printing signals are delivered from a printing circuit (not shown), the carriage 26 is first moved to a print start position for the initial line, and the thermal head 28 is then shifted to the contact position by a thermal head shifting mechanism (not shown). Thereafter, the moment the resistors on the thermal head 28 constituting the desired patterns, such as figures, characters, and other signs, corresponding to the printing signals are driven for the generation of heat by the thermal head drive IC, the carriage 26 is moved rightward in FIG. 3 at a predetermined speed. At the same time, the ink ribbon 10 is moved from the ink ribbon supply reel to the ink ribbon take-up reel at a predetermined speed. While the carriage 26 is moved rightward in FIG. 3, the ink of the predetermined patterns responsive to the printing signals delivered successively from the printing circuit is transferred from the ribbon 10 to the recording paper 42. When the printing of an entire line is finished, the thermal head 28 is shifted to the noncontact position, and the carriage 26 is then moved to a print start position for the next line. At the same time, the platen 22, along with the paper 42, rotates for one line in the clockwise direction of FIG. 3. Thereafter, the aforesaid printing operation processes are repeated. Since the ink ribbon take-up reel shaft 30 is kept from rotating while the carriage 26 is being moved to the print start position for the next line, the ink ribbon 10 cannot be moved from ink ribbon supply reel to ink ribbon take-up reel.

Figure 4:
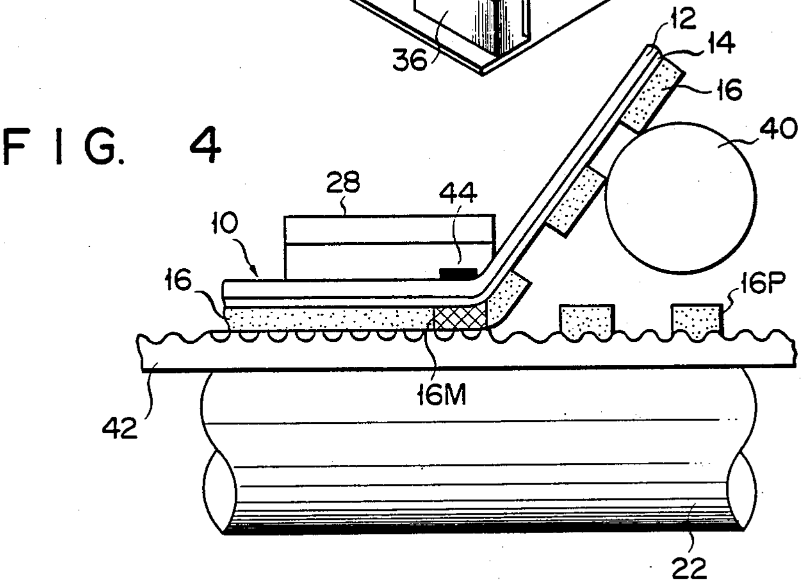
FIG. 4 is an enlarged view schematically showing the state in which the ink is transferred from the ink ribbon of FIG. 1 to ordinary paper without special smoothness in the serial printer of FIG. 3.

FIG. 4 is an enlarged view schematically showing the state in which the ink 16 is transferred from the ink ribbon 10 to the recording paper 42 in the serial printer described above.

As shown in FIG. 4, the recording paper 42 is PPC paper or bond paper whose surface is rougher than the specially smoothed surface of conventional exclusive-use paper for thermal-transfer recording. Therefore, only the microscopic projections on the surface of the paper are in contact with the ink 16 of the ink ribbon 10. A plurality of resistors 44 on the thermal head 28 are located at the downstream end position on the ink ribbon sliding contact surface of the thermal head 28 with respect to the feed direction of the ink ribbon.

Those portions of the bonding layer 18 (see FIG. 1) corresponding in position to heated resistors 44 are destroyed by high-temperature heat, as mentioned before, so that softened or melted ink 16M in corresponding positions to heated resistors 44 is brought into contact with the intermediate layer 14. The ink 16M contacted intermediate layer 14 is reduced in adhesion to the intermediate layer 14 due to the properties of the intermediate layer 14 described before. Since the ink 16 can be supercooled, softened or melted ink 16M remains unsolidified for a predetermined time. Further, the cohesion of softened or melted the ink 16M is relatively high. Therefore, ink 16M can securely be transferred from the ink ribbon 10 to the recording paper 42, such as the PPC paper or bond paper, having a relatively rough surface which can contact the ink 16M on the ink ribbon 10 only at its plurality of projections of the rough surface. Ink 16P attached on the recording paper 42 forms the desired patterns without any voids or uninked spots.

As mentioned before, the resistors 44 on the thermal head 28 are located at the downstream end position on the ink ribbon sliding contact surface of the thermal head 28 with respect to the ink ribbon feed direction. Also, the moment the ink ribbon 10 separates from the ink ribbon sliding contact surface of the thermal head 28, the ribbon-paper separating pin 40 makes the ink ribbon 10 move far away from the recording paper 42 on the platen 22. Further, the ink 16 having a property of supercooling remains softened or melted for a longer time after the finish of heating compared with the prior art ink having no property of supercooling. Thus, the transfering of the ink 16 from the ink ribbon 10 to the recording paper 42 can be finished before the fluidity of the ink 16 is reduced that is, under a good transfer condition.

The results of experiments conducted by the inventors indicate that, for secure the ink transfer from ink ribbon 10 to the recording paper 42, the ink 16 should preferably remain unsolidified for about 50 microseconds or more after the end of heating for softening or melting of the ink 16.

Figure 5:
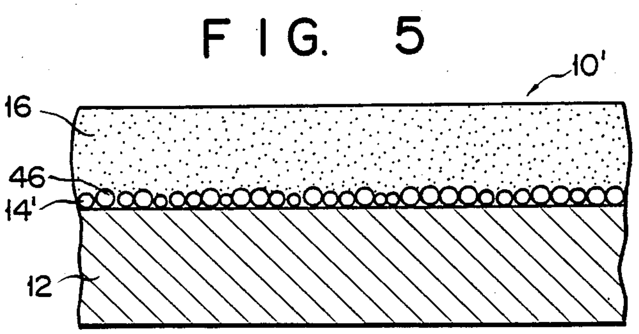
FIG. 5 is a sectional view schematically showing a modified example of a second ink ribbon according to the embodiment of the invention.

Referring now to FIG. 5, a modified example of the ink ribbon of the invention will be described. In this modification, the same reference numerals are used to designate the same portions as included in the ink ribbon 10 of the foregoing embodiment.

Ink the ribbon 10' of this modification and ribbon 10 of the above embodiment are different in the construction of the intermediate layer. Intermediate layer 14' of the ribbon 10' is formed of a plurality of capsules 46 applied on the ink supporting member 12, and the ink 16 is applied on the surface of the intermediate layer 14'.

The capsules 46 are designed so as to be destroyed at a temperature above the temperature at which the ink 16 is softened or melted. The capsules 46 contain an adhesion reducing agent adapted to reduce the adhesion of the intermediate layer 14 to the softened or melted ink 16. The capsules 46 can be destroyed by melting the capsule film or by thermally increasing their internal pressure to burst the film. When bursting the film through the pressure increase, the capsules 46 should preferably be loaded with a foaming agent which foams when heated above the temperature at which the ink 16 is softened or melted. The foaming agent makes the bursting of the capsule film easier.

The capsules 46 may be formed by a well-known method, such as interfacial polymerization, coacervation, etc. The shape of each capsule 46 may be any other configuration than the spherical one shown in FIG. 5. Even though the capsules 46 are sparsely distributed and not in contact with one another, the capsules 46 can give satisfactory transferability to the ink 16 unless they are too scattered. Preferably, however, the capsules 46 should be distributed densely enough to be in contact with one another, as shown in FIG. 5, for the best transferability.

The thermal-transfer recording apparatus, using the ink ribbon 10 or 10' according to the two illustrated embodiments of the present invention, has been described as a serial printer herein. Alternatively, however, it may be a line printer, as far as it is constructed so that ink ribbon and recording paper are separated from each other immediately after ink of the ribbon is heated into desired patterns for transfer by a plurality of resistors on the thermal head. It is to be understood, also in this case, that the resistors should preferably be located in the downstream end position at the ink ribbon sliding contact surface of the thermal head with respect to the ribbon feed direction.

What is claimed is:

1. An ink ribbon comprising:
- an ink supporting member;
- an intermediate layer mounted on the ink supporting member; and
- ink mounted on the intermediate layer,
- said ink having supercooling property and being susceptible to softening or melting by heat, and
- said intermediate layer being adapted to reduce adhesion of the ink to the intermediate layer above a temperature at which the ink is softened or melted.

2. The ink ribbon according to claim 1, wherein said intermediate layer is a metal film.

3. The ink ribbon according to claim 1, wherein said intermediate layer includes capsules distributed substantially uniformly on the ink supporting member and being destroyed when the capsules are heated above a temperature at which the ink is softened or melted, and an adhesion reducing agent stored in the capsules and adapted to reduce the adhesion of the intermediate layer to the softened or melted ink.

4. The ink ribbon according to claim 3, wherein said capsules store a foaming agent being susceptible to foam when the foaming agent is heated above the temperature at which the ink is softened or melted.

5. The ink ribbon according to claim 1, wherein said ink exhibits relatively high cohesion when the ink is softened or melted by heat.

6. The ink ribbon according to claim 5, wherein said intermediate layer is a metal film.

7. The ink ribbon according to claim 5, wherein said intermediate layer includes capsules distributed substantially uniformly on the ink supporting member and being destroyed when the capsules are heated above a temperature at which the ink is softened or melted, and an adhesion reducing agent stored in the capsules and adapted to reduce the adhesion of the intermediate layer to the softened or melted ink.

8. The ink ribbon according to claim 1, wherein said ink remains unsolidified for about 50 microseconds or more after the end of heating for softening or melting the ink.

9. The ink ribbon according to claim 8, wherein said ink exhibits relatively high cohesion when the ink is softened or melted by heat.

10. The ink ribbon according to claim 8, wherein said intermediate layer is a metal film.

11. The ink ribbon according to claim 8, wherein said intermediate layer includes capsules distributed substantially uniformly on the ink supporting member and being destroyed when the capsules are heated above a temperature at which the ink is softened or melted, and an adhesion reducing agent stored in the capsules and adapted to reduce the adhesion of the ink to the intermediate layer above the temperature at which the ink is softened or melted.

12. The ink ribbon according to claim 1, further comprising a solidified ink bonding layer between the intermediate layer and the ink for strengthening the adhesion of the solidified ink to the intermediate layer.

13. The ink ribbon according to claim 12, wherein said intermediate layer is a metal film.

14. The ink ribbon according to claim 12, wherein said ink exhibits relatively high cohesion when the ink is softened or melted by heat.

15. The ink ribbon according to claim 12, wherein said ink remains unsolidified for about 50 microseconds or more after the end of heating for softening or melting the ink.

16. The ink ribbon according to claim 1, wherein said ink supporting member has a heat resisting layer on the opposite side thereof to the intermediate layer.

17. The ink ribbon according to claim 16, wherein said intermediate layer is a metal film.

18. The ink ribbon according to claim 16, wherein said ink exhibits relatively high cohesion when the ink is softened or melted by heat.

19. The ink ribbon according to claim 16, wherein said ink remains unsolidified for about 50 microseconds or more after the end of heating for softening or melting the ink.

20. A thermal-transfer recording apparatus using an ink ribbon which comprises an ink supporting member, an intermediate layer mounted on the ink supporting member, and ink mounted on the intermediate layer, said ink having supercooling property and being susceptible to be softened or melted by heat, and said intermediate layer being adapted to reduce adhesion of the ink to the intermediate layer above the temperature at which the ink is softened or melted, said apparatus comprising:
- a thermal head including a plurality of heating elements and slidably contacting the ink ribbon, said heating elements being adapted to be heated for predetermined patterns so that the ink of the ink ribbon being slidably contacted with the thermal head is heated to be softened or melted for the predetermined patterns, and is transferred to the recording paper overlapping the ink ribbon, and
- wherein said heating elements are located at a downstream end position, with respect to the feed direction of the ink ribbon, on the ink ribbon sliding contact surface of the thermal head.

21. The thermal-transfer recording apparatus according to claim 20, further comprising separating means for separating the ink ribbon and the recording paper from each other the moment the ribbon and the paper, facing each other, are separated from the ink ribbon sliding contact surface of the thermal head.

22. The thermal-transfer recording apparatus according to claim 20, wherein said intermediate layer of the ink ribbon is a metal film.

23. The thermal-transfer recording apparatus according to claim 20, wherein said ink of the ink ribbon exhibits its relatively high cohesion when the ink is softened or melted by heat.

24. The thermal-transfer recording apparatus according to claim 20, wherein said ink of the ink ribbon remains unsolidified for about 50 microseconds or more after the end of heating for softening or melting ink.

25. The thermal-transfer recording apparatus according to claim 20, further comprising a solidified ink bonding layer between the intermediate layer and the ink for strengthening the adhesion of the solidified ink to the intermediate layer.

26. The thermal-transfer recording apparatus according to claim 20, wherein said ink supporting member of the ink ribbon has a heat resisting layer on the opposite side thereof to the intermediate layer.

27. The thermal-transfer recording apparatus according to claim 20, wherein said intermediate layer of the ink ribbon includes capsules distributed substantially uniformly on the ink supporting member and being destroyed when the capsules are heated above a temperature at which the ink is softened or melted, and an adhesion reducing agent stored in the capsules and adapted to reduce the adhesion of the ink to the intermediate layer above the temperature at which the ink is softened or melted.

28. The thermal-transfer recording apparatus according to claim 27, wherein said capsules store a foaming agent being susceptible to foam when the foaming agent is heated above the temperature at which the ink is softened or melted.

29. An ink ribbon comprising:

(a) an ink supporting member;

(b) ink containing a supercooling inducing material and having a hysteretic property such that, during a temperature rise, it suddenly decreases in viscosity and softens or melts when its temperature exceeds its melting point, but, during a temperature fall, the supercooling material acts so that the viscosity of said ink is much lower at each temperature than it is during the temperature rise;

(c) an intermediate layer mounted on said ink support; and (d) a bonding layer interposed between said intermediate layer and said ink, said bonding layer being temperature sensitive such that, at a temperature beneath the melting temperature of said ink, it strengthens the adhesion of said ink to said intermediate layer, thereby preventing solidified ink from separating from said intermediate layer, and, at a temperature equal to or above the melting temperature of said ink, said bonding layer is destroyed, permitting said ink to come directly into contact with said intermediate layer.

30. An ink ribbon as recited in claim 29 wherein said bonding layer is deposited on said intermediate layer by silane coupling treatment.

31. An ink ribbon as recited in claim 29 wherein said ink is composed of 7 parts by weight of carbon black, 3 parts by weight of oil black, 20 parts by weight of microcrystalline wax, 40 parts by weight of low-molecular ethylene-vinyl acetate copolymer, and 30 parts by weight of dicyclohexyl phthalate.

32. An ink ribbon as recited in claim 29 wherein said ink comprises a coloring material, a binder, and said supercooling inducing material.

33. An ink ribbon as recited in claim 29 wherein said supercooling inducing material is selected from the group consisting of dicyclohexyl phthalate, benzotriazole, and acetanilide.

34. An ink ribbon as recited in claim 29 wherein said supercooling inducing material is dicyclohexyl phthalate.

* * * * *